United States Patent Office 3,471,269
Patented Oct. 7, 1969

3,471,269
SALTS OF THE ANION $B_8H_8^{2-}$
Frank K. Klanberg, Wilmington, Del., assignor to E. I. du Pont de Nemours and Company, Wilmington, Del.
No Drawing. Filed Sept. 14, 1966, Ser. No. 579,221
Int. Cl. C01b 6/08
U.S. Cl. 23—361                              7 Claims

ABSTRACT OF THE DISCLOSURE

Alkali metal salts of $B_8H_8^{2-}$ can be prepared by reaction of the lithium sodium or potassium salts of $B_9H_9^{2-}$ with air in aliphatic ethers or cycloaliphatic ethers as the reaction medium. Other salts of $B_8H_8^{2-}$ can be prepared by metathetical reaction.

DESCRIPTION OF THE INVENTION

This invention relates to novel polyhedral boron compounds and their preparation. More specifically, it concerns salts of the octahydrooctaborate anion $B_8H_8^{2-}$.

Salts of the $B_8H_8^{2-}$ anion can be represented by the formula $M_a(B_8H_8)_b \cdot mH_2O$; wherein M is a cation having a total atomic weight of at least 5 and a valence of 1 to 3, i.e., 1, 2, or 3 and is defined further below; $(B_8H_8)$ is a polyhedral borate anion of valence 2−; $m$ is an integer of 0 to 10; and $a$ and $b$ are the smallest positive integers of 1 to 3 which satisfy the equation $$b = \frac{a \times \text{valence of } M}{2}$$

The group M bears a positive ionic charge and is ionically bonded to the borate anion. The principal function of the group M is to provide an element or group of elements which bear the necessary positive charges to combine with the novel anion, and thus permit its isolation as part of a stable compound. The properties of the group M are not critical and therefore represent a broad range of elements or combinations of elements.

To illustrate, M can be certain metals, ammonium ($NH_4^+$), hydrocarbyl-substituted ammonium, hydrocarbyl-substituted phosphonium, hydrocarbyl-substituted sulfonium, hydrocarbyl-substituted arsonium, or metal-ammine. Because of availability, cations wherein the valence is 1 or 2 are preferred.

Metals that can serve as cations include the elements of Group I-A having atomic numbers of 3–55, inclusive; Group II-A having atomic numbers of 12–56, inclusive; II-B having atomic numbers of 30–48, inclusive; the first series of transition elements having atomic numbers 24–28, inclusive; and thallium. These groups are those shown in the Periodic Table in Lange's "Handbook of Chemistry," 9th edition, pp. 56 and 57, Handbook Publishers, Inc. (1956). Specific metals operable as cations in the salts of this invention are lithium, sodium, potassium, rubidium, cesium, magnesium, calcium, strontium, barium, zinc, cadmium, chromium, manganese, iron, cobalt, nickel, and thallium. Preferred metals are the alkali and alkaline earth metals, and most preferred are the alkali metals, especially cesium, rubidium, potassium, and sodium.

The hydrocarbyl-substituted ammonium, sulfonium, phosphonium or arsonium cations can be represented by the formulas $RNH^+$, $R_2NH_2^+$, $R_3NH^+$, $R_4N^+$, $RPH_3^+$, $R_2PH_2^+$, $R_3PH^+$, $R_4P^+$, $RAsH_3^+$, $R_2AsH_2^+$, $R_3AsH^+$, $R_4As^+$, and $R_3S^+$. In these formulas R represents hydrocarbyl. The hydrocarbyl substituents are not critical features of the cations and thus can be open chain, closed chain, saturated, unsaturated or a heterocyclic ring of which the N, S, P, or As atoms are the hetero component. Thus, R can be alkyl, cycloalkyl, alkenyl, alkynyl, aryl, alkaryl, aralkyl, alkylene, and the like. Because of availability, R preferably contains not more than 18 carbon atoms. For example, R can be methyl, 2-ethylhexyl, octadecyl, allyl, cyclohexyl, cyclohexenyl, phenyl, naphthyl, anthryl, cyclohexylphenyl, diphenylyl, benzyl, and the like. Preferably, R is alkyl or aryl of up to 10 carbon atoms. Thus, atomic weights of hydrocarbyl-substituted cations can range from a low value of about 32 for $CH_3NH_3$ to a value as high as about 800 or even higher for long-chain substituted cations, e.g., the cation from trioctadecylamine.

The cation can also be a metal-ammine such as those of the formula $(NH_3)_nY$, where $n$ is a positive whole number of at most 6 and Y is cobalt, nickel, copper, zinc, or cadmium, as, for example, $Co(NH_3)_6^{2+}$, $Cd(NH_3)_2^{2+}$, $Zn(NH_3)_4^{2+}$, and the like.

The cation can also be a combination of cations, as, for example, two monovalent metals or a monovalent metal and a hydrocarbyl-substituted ammonium group. These are exemplified by $NaKB_8H_8$, $Cs(CH_3)_4NB_8H_8$, and the like.

Examples of novel $B_8H_8^{2-}$ salts of the invention are as follows:

$Li_2B_8H_8 \cdot 6$—$10H_2O$
$Na_2B_8H_8 \cdot 6$—$10H_2O$
$Cs_2B_8H_8$
$Rb_2B_8H_8$
$MgB_8H_8 \cdot 6H_2O$
$SrB_8H_8 \cdot 2H_2O$
$BaB_8H_8 \cdot 2H_2O$
$ZnB_8H_8 \cdot 6H_2O$
$Tl_2B_8H_8$
$FeB_8H_8 \cdot 6H_2O$
$NiB_8H_8 \cdot 6H_2O$
$CoB_8H_8 \cdot 6H_2O$
$MnB_8H_8 \cdot 6H_2O$
$(NH_4)_2B_8H_8$
$[(C_2H_5)_4N]_2B_8H_8$
$[(C_8H_{17})NH_3]_2B_8H_8$
$[(C_{18}H_{37})_2NH_2]_2B_8H_8$
$[(C_4H_9)_3NH]_2B_8H_8$
(pyridinium)$_2B_8H_8$
(quinolinium)$_2B_8H_8$
$[(C_6H_{11})_2NH_2]_2B_8H_8$
$[(C_6H_5CH_2)_2NH_2]_2B_8H_8$
$[(C_3H_5)_3NH]_2B_8H_8$
$Zn(NH_3)_4B_8H_8$
$[(C_6H_5)_4P]_2B_8H_8$
$[(C_4H_9)_2PH_2]_2B_8H_8$
$[(C_8H_{17})_3PH]_2B_8H_8$
$[(C_{18}H_{37})PH_3]_2B_8H_8$
$[(C_4H_9)_3S]_2B_8H_8$
$[(C_2H_5)_4As]_2B_8H_8$
$[(C_4H_9)_2AsH_2]_2B_8H_8$
$[(C_8H_{17})_3AsH]_2B_8H_8$ The alkali metal salts of $B_8H_8^{2-}$ are prepared by reacting a compound of the formula $M_2''B_9H_9 \cdot mH_2O$ wherein $M''$ is lithium, sodium or potassium and $m$ is an integer of 0 to 10, with air in certain cyclic or open-chain ethers as reaction media. Ethers that are operable include tetrahydrofuran, dimethoxyethane, bis(2 - ethoxyethyl) ether, bis[2-(2-methoxyethoxy)ethyl] ether, di-n-butyl ether, and the like. The temperature at which the reaction is carried out is not critical, any temperature in which the reaction medium is liquid being operable. Ordinary room temperatures, e.g., 20–30° C., are most convenient. Pressure is not critical, and ordinarily atmospheric pressures are employed.

The lithium, sodium, and potassium salts obtained in this manner are soluble in the reaction mixture, and they can, if desired, be isolated from the mixture by evaporation of the reaction medium to dryness. The cesium and rubidium salts of $B_8H_8^{2-}$ can be precipitated from the above reaction solutions containing lithium, sodium, or potassium salts of $B_8H_8^{2-}$ by addition of aqueous cesium hydroxide or rubidium hydroxide solution to the reaction mixture. The precipitated salts are then isolated by conventional means, e.g., filtration and drying.

The lithium, sodium, and potassium nonahydrononaborate starting materials for the above process can be prepared by heating cesium triborohydride of formula $CsB_3H_8$ in the absence of a solvent and in the absence of oxygen at 200–400° C., preferably at 220–250° C., at pressures ranging from $10^{-4}$ mm. of mercury up to 100 atmospheres, until the evolution of hydrogen ceases. The resulting cesium salt of $B_9H_9^{2-}$ can be converted to the lithium, sodium, or potassium salt of $B_9H_9{}^{2-}$, respectively, by standard ion exchange procedures in aqueous solution. This process is described in greater detail in applicant's copending application Ser. No. 529,242, filed Feb. 23, 1966.

Other salts of the $B_8H_8{}^{2-}$ anion can be prepared from the alkali metal salts by methods involving simple metathetical reactions with other salts or hydroxides under neutral or alkaline conditions to effect an exchange of cations. The hydrocarbyl-substituted ammonium, phosphonium, sulfonium, or arsonium cation-containing compounds can be obtained by treating the sodium salt of $B_8H_8{}^{2-}$ anion with the corresponding hydroxide or halide whereupon the desired product precipitates. For example, an aqueous solution of $Na_2B_8H_8$ can be reacted with aqueous tetrapropylammonium hydroxide with the formation of a precipitate of $[(C_3H_7)_4N]_2B_8H_8$. Also, $Na_2B_8H_8$ can be reacted with an aqueous solution of triphenylmethylphosphonium bromide with the formation of a precipitate of $[(C_6H_5)_3CH_3P]_2B_8H_8$.

Another method for preparing some of the salts of $B_8H_8{}^{2-}$ from the alkali metal salts involves passing an aqueous solution of the alkali metal salt through a column packed with a basic ion-exchange resin containing a different cation and evaporating the effluent solution to dryness. In this method the salt is usually isolated as its hydrate.

The metal-ammine salts can be prepared by treating the sodium salt of $B_8H_8{}^{2-}$ with the halide, Y halide, in ammonium hydroxide whereupon the metal-ammine salt of $B_8H_8$ precipitates.

Other metal cation salts of $B_8H_8{}^{2-}$ can be obtained by metathetical reaction with the metal salts. A water-soluble salt of $B_8H_8{}^{2-}$, such as the sodium salt, is reacted with another water-soluble salt, e.g., TlF, chosen such that the cation of the second salt will precipitate with the $B_8H_8{}^{2-}$ anion. Thus, $Tl_2B_8H_8$ can be obtained in this manner.

Many of the metal salts of the $B_8H_8{}^{2-}$ anions are isolated from aqueous systems in the form of hydrated salts, i.e., the salts crystallize with water of hydration. Thus, the hydrated salts are those of the general formula $M_a(B_8H_8)_b \cdot mH_2O$, where $m$ is a positive number greater than zero but not more than 10. In some cases, the water of hydration can be removed by heating the hydrated salt to elevated temperature under reduced pressure, e.g., by heating at 150–200° C. under a pressure of less than 0.1 mm. of mercury for several hours.

The products and processes of this invention are illustrated in further details in the following examples.

Example 1

Solid hydrated sodium nonahydrononaborate (5.0 g.) was heated in 180 ml. of dimethoxyethane to a temperature of about 80° C. The warm suspension was filtered to give an insoluble gelatinous residue and a blood-red solution. A stream of air was bubbled through the red dimethoxyethane filtrate for about 4 hours at room temperature (ca. 25° C.). After this time, the solution had become colorless. A mixture of 50 ml. of water and 20 ml. of concentrated cesium hydroxide solution was then added to the dimethoxyethane solution, and the resulting precipitate was collected by filtration and recrystallized from 75 ml. of water.

The yield was 3.7 g. of cesium octahydrooctaborate, $Cs_2B_8H_8$.

*Analysis.*—Calcd. for $Cs_2B_8H_8$: B, 24.0%. Found: B, 24.3%.

Platinum-catalyzed acid hydrolysis gave 1059 ml. of $H_2$ per gram of $Cs_2B_8H_8$ compared to a calculated amount of 1057 ml./g.

The infrared spectrum of $Cs_2B_8H_8$ shows two strong B—H stretching vibrations at 2480 and 2450 cm.$^{-1}$; other bands are at 1138 (m), 1000 (vw), 950 (vw), 900 (w), 860 (w), 834 (vw), 715 (pw), 660 (vw), 630 (w), and at 620 cm.$^{-1}$. The symbols in parentheses indicate the following intensities: $m$=medium; $w$=weak; $vw$=very weak.

The $B^{11}$ n.m.r. spectrum, measured at 19.3 mc., consists of one doublet at $\delta = +24.1$ p.p.m. (relative to trimethyl borate); the B—H coupling constant is $128 \pm 2$ cps. This implies spectroscopic equivalence of all eight boron atoms in the polyhedral cage of $B_8H_8{}^{2-}$, and a point group symmetry of $D_{4d}$.

Example 2

A solution of 3.0 g. of $Cs_2B_8H_8$ in 200 ml. of warm water was passed through a column packed with the sodium ion-exchange resin which was prepared by saturating the cation-exchange resin known commercially as "Rexyn" 101 (H) with an aqueous solution of sodium chloride and washing with water until the runoff was neutral and free of chloride ion. The eluate was evaporated to dryness to give 1.1 g. of hydrated, hygroscopic sodium octahydrooctaborate, $Na_2B_8H_8 \cdot mH_2O$.

Example 3

An aqueous solution of sodium octahydrooctaborate, containing ca. 0.2 g. of $Na_2B_8H_8$, was prepared as described in Example 2. The addition of an aqueous solution of rubidium chloride to this $Na_2B_8H_8$ solution precipitated 0.4 g. of white, solid $Rb_2B_8H_8$ which was recrystallized from 5 ml. of water.

*Analysis.*—Calcd. for $Rb_2B_8H_8$: B, 32.6%; H, 3.0%; hydrolytic $H_2$, 1434 ml./g. Found: B, 32.5%; H, 3.3%; hydrolytic $H_2$, 1450 ml./g.

The infrared spectrum of $Rb_2B_8H_8$ was identical with that of $Cs_2B_8H_8$.

Example 4

A solution of 0.4 g. of hydrated $Na_2B_8H_8$ (prepared as in Example 2) in 10 ml. of water was divided into two equal parts. A solution of zinc(II) chloride in ammonium hydroxide was added to the first part. The resulting precipitate was recrystallized from 100 ml. of dilute ammonium hydroxide solution to give 30 mg. of colorless platelets of zinc tetrammine octahydrooctaborate. The compound was identified by chemical analysis, by infrared analysis, as well as by single crystal X-ray analysis.

*Analysis.*—Calcd. for $Zn(NH_3)_4B_8H_8$: N, 24.6%; H, 8.8%. Found: N, 24.2%; H, 9.1%.

Crystals of $Zn(NH_3)_4B_8H_8$ are tetragonal with the parameters $a = 7.487$A., $c = 10.80$A., and $Z = 2$. The space group is $P4_2/nmc$.

Example 5

To the second portion of the aqueous solution of $Na_2B_8H_8$ from Example 4, a solution of cadmium chloride in ammonium hydroxide was added. The precipitated solid was collected by filtration and recrystallized from 150 ml. of dilute ammonium hydroxide solution to give 0.1 g. of glittering, colorless plates of cadmium diammine octahydrooctaborate.

*Analysis.*—Calcd. for $Cd(NH_3)_2B_8H_8 \cdot \frac{1}{2}H_2O$: N, 11.2%; H, 6.1%; B, 34.6%. Found: N, 12.0%; H, 6.4%; B, 34.5%.

Crystals of $Cd(NH_3)_2B_8H_8 \cdot \frac{1}{2}H_2O$ are monoclinic with parameters $a = 6.387$A., $b = 13.084$A., $c = 14.242$A., $\beta = 124.0°$, and $Z = 4$. The calculated density is $\rho = 1.68$, the experimentally determined density (by flotation) was $\rho = 1.65$ Example 6

A solution of cobalt(II) chloride in ammonium hydroxide was added to an aqueous solution of $Na_2B_8H_8$ containing ca. 0.1 g. of $Na_2B_8H_8$. The resulting cream-colored precipitate was collected by filtration, washed with methanol and ether, and air-dried. There was obtained 0.1 g. of cobalt hexammine octahydrooctaborate. The infrared spectrum of this salt showed only the readily identifiable composite features of the $Co(NH_3)_6{}^{2+}$ cation and the $B_8H_8{}^{2-}$ anion.

*Analysis.*—Calcd. for $Co(NH_3)_6B_8H_8$: B, 33.8%; N, 32.9%; H, 10.3%. Found: B, 33.4%; N, 31.2%; H, 9.4%.

Example 7

An aqueous solution containing ca. 0.1 g. of $Na_2B_8H_8$ was mixed with a solution of nickel(II) chloride in ammonium hydroxide. The resulting light violet precipitate was collected by filtration, washed with methanol and ether, and air-dried. A total of 150 mg. of nickel hexammine octahydrooctaborate was recovered and identified by infrared analysis.

Example 8

A solution of 0.5 g. of $Na_2B_8H_8$ (prepared as in Example 2) in water was treated with an excess of triphenylmethylphosphonium bromide in water. A dark red precipitate (2.3 g.) was obtained. This red solid decomposed without melting at 216° C. The infrared spectrum showed the absorption bands of the $(C_6H_5)_3PCH_3^+$ cation and the $B_8H_8^{2-}$ anion. The analysis of the red salt was in agreement with the composition $[(C_6H_5)_3PCH_3]_2B_8H_8$.

*Analysis.*—Calcd. for $[(C_6H_5)_3PCH_3]_2B_8H_8$: C, 70.3%; H, 6.8%; P, 9.5%; B, 13.3%. Found: C, 69.1%; H, 6.6%; P, 9.3%; B, 14.5%.

Example 9

Hydrated sodium octahydroborate from Example 2 (50 mg.) was redissolved in water and an aqueous solution containing 0.5 g. of tetraphenylarsonium chloride was added. The resulting precipitate was collected by filtration, washed with ether, and air-dried. A pink solid (30 mg.) was obtained, the infrared spectrum of which showed a superposition of the absorption bands of the $(C_6H_5)_4As^+$ cation and the $B_8H_8^{2-}$ anion. This indicated that the product was $[(C_6H_5)_4As]_2B_8H_8$.

By using the procedure of the examples listed below and the specific reactants listed below with $Cs_2B_8H_8$ or $Na_2B_8H_8$, the products listed below can be obtained:

| Example | Reactant | Product |
| --- | --- | --- |
| 8 | $(C_2H_5)_3NHCl$ | $[(C_2H_5)_3NH]_2B_8H_8$ |
| 8 | $(C_2H_5)_2NH_2Cl$ | $[(C_2H_5)_2NH_2]_2B_8H_8$ |
| 8 | $CH_3NH_3Br$ | $(CH_3NH_3)_2B_8H_8$ |
| 8 | $(C_2H_5)_2AsH_2Cl$ | $[(C_2H_5)_2AsH_2]_2B_8H_8 + (C_2H_5)_2AsH_2B_8H_8$ |
| 8 | $(C_4H_9)_3AsHCl$ | $[(C_4H_9)_3AsH]_2B_8H_8 + (C_4H_9)_3AsHB_8H_8$ |
| 8 | $(C_2H_5)PH_3Br$ | $[(C_2H_5)PH_3]_2B_8H_8$ |
| 8 | $(C_4H_9)(C_2H_5)_2PHCl$ | $[(C_4H_9)(C_2H_5)_2PH]_2B_8H_8 + (C_4H_9)(C_2H_5)_2PHB_8H_8$ |
| 8 | $(C_2H_5)_3SBr$ | $[(C_2H_5)_3S]_2B_8H_8$ |
| 8 | $(C_6H_5)(CH_3)_2SBr$ | $[(C_6H_5)(CH_3)_2S]_2B_8H_8$ |
| 2 | $Mg^{2+}$ ion-exchange resin | $MgB_8H_8 \cdot 6H_2O$ |
| 2 | $Ba^{2+}$ ion-exchange resin | $BaB_8H_8 \cdot 2H_2O$ |
| 2 | $Zn^{2+}$ ion-exchange resin | $ZnB_8H_8 \cdot 6H_2O$ |
| 2 | $Mn^{2+}$ ion-exchange resin | $MnB_8H_8 \cdot 6H_2O$ |
| 2 | $Ni^{2+}$ ion-exchange resin | $NiB_8H_8 \cdot 6H_2O$ |

The products of this invention are crystalline solids that are salt-like in character. Many of the compounds are soluble in water and alcohols. Salts having organo-substituted cations are also soluble in organic solvents such as ketones, nitriles, amides, or sulfoxides. A characteristic feature of alkali metal salts of $B_8H_8^{2-}$ is their high thermal stability. For example, $Cs_2B_8H_8$ is recovered unchanged after being heated to 600° C. for 90 minutes.

Aqueous solutions containing the anion $B_8H_8^{2-}$ are strongly reducing. Ions of noble metals such as $Pd^{2+}$ or $Ag^+$ are reduced to the free metals by such solutions. Upon acidification of solutions of $B_8H_8^{2-}$, hydrogen is liberated.

The salts of this invention are useful for various purposes. Aqueous solutions containing the $B_8H_8^{2-}$ anion are strongly reducing and can be used as reducing agents. A particular application in which the reducing action of these salts is especially useful is in the preparation of printed electrical circuits. For example, on a clean paper surface a circuit is traced using an aqueous solution of cesium octahydrooctaborate. After evaporation of the solvent, the tracings are sprayed with a solution of palladium chloride in acetonitrile. A black metallic tracing of palladium appears along the circuit lines.

The octahydrooctaborate salts of this invention are also useful as solid hydrogen carriers since they generate hydrogen gas readily in an acidified aqueous medium. For example, 1 g. of $Na_2B_8H_8$ gives 2.7 liters of hydrogen, whereas 1 g. of calcium hydride, which is commonly used for that purpose, gives only 1.1 liters of hydrogen.

The substituted phosphonium, arsonium and ammonium salts of the $B_8H_8^{2-}$ and $B_8H_8^-$ anions are useful as initiators for the polymerization of ethylene. For example, a suspension of 40 mg. of the red triphenylmethylphosphonium salt from Example 8 in benzene gave a yield of 13 g. of polyethylene when heated to 125° C. under 1000 atmospheres pressure of ethylene.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula $M_a(B_8H_8)_b \cdot mH_2O$ wherein M is a cation having an atomic weight of at least 5, and a valence of 1 through 3; $(B_8H_8)$ is a polyhedral borate anion of valence $2^-$; $m$ is an integer of 0 through 10; and $a$ and $b$ are the smallest positive integers of 1 through 3 which satisfy the equation $$b = \frac{a \times \text{valence of } M}{2}$$

2. Compounds of claim 1 which have the formula $M_a(B_8H_8)_b \cdot mH_2O$ wherein the components are defined as in claim 1.

3. Compounds of claim 2 wherein M is selected from the class consisting of lithium, sodium, potassium, rubidium, cesium, magnesium, calcium, strontium, barium, zinc, cadmium, chromium, manganese, iron, cobalt, nickel, thallium, ammonium, $RNH_3^+$, $R_2NH_2^+$, $R_3NH^+$, $R_4N^+$, $RPH_3^+$, $R_2PH_2^+$, $R_3PH^+$, $R_4P^+$, $RAsH_3^+$, $R_2AsH_2^+$, $R_3AsH^+$, $R_4As^+$, $R_3S^+$ wherein R is selected from the class consisting of alkyl and aryl of up to 10 carbon atoms, and $(NH_3)_nY$ wherein $n$ is a positive whole number of at most 6 and Y is selected from the class consisting of cobalt, nickel, copper, zinc and cadmium.

4. The compound of claim 2 having the formula $Cs_2B_8H_8 \cdot mH_2O$.

5. The compound of claim 2 having the formula $Na_2B_8H_8 \cdot mH_2O$.

6. The compound of claim 2 having the formula $[(C_6H_5)_3PCH_3]_2B_8H_8$.

7. Process for preparing compounds of the formula $M''_2B_8H_8 \cdot mH_2O$ wherein M'' is selected from the class consisting of lithium, sodium and potassium and $m$ is an integer of 0 through 10; which comprises reacting a compound of the formula $M''_2B_9H_9 \cdot mH_2O$ with air in the presence of a reaction medium selected from the class consisting of cyclic hydrocarbon ethers and open-chain hydrocarbon ethers that are liquid at the reaction temperature.

References Cited

UNITED STATES PATENTS 3,406,019  10/1968  Muetterties _____ 23—361
3,411,891  11/1968  Klanberg _____ 23—361

OTHER REFERENCES

Muetterties et. al.: "Polyhedral Boranes" in Chemical and Engineering News; May 9, 1969; pp. 88–98.

OSCAR R. VERTIZ, Primary Examiner

G. O. PETERS, Assistant Examiner

U.S. Cl. X.R.

23—362; 260—446, 606.5